United States Patent [19]

Ott et al.

[11] Patent Number: 4,518,515

[45] Date of Patent: May 21, 1985

[54] MOULDING COMPOSITIONS OF VINYL CHLORIDE POLYMERS, GRAFT POLYMERS AND POLYMERIC PLASTICIZERS HAVING A HIGH RESISTANCE TO AGEING

[75] Inventors: Karl-Heinz Ott, Leverkusen; Christian Lindner, Cologne; Walter Uerdingen, Leverkusen; Hans-Eberhard Braese, Cologne; Helmut Hurnik, Leverkusen, all of Fed. Rep. of Germany

[73] Assignee: Bayer Aktiengesellschaft, Leverkusen, Fed. Rep. of Germany

[21] Appl. No.: 516,633

[22] Filed: Jul. 25, 1983

[30] Foreign Application Priority Data

Aug. 4, 1982 [DE] Fed. Rep. of Germany ....... 3229078

[51] Int. Cl.³ .................. C08L 27/06; C08L 31/04; C08L 51/04; C08L 52/02
[52] U.S. Cl. ........................................ 525/79; 525/75; 525/80; 525/83; 525/84; 525/85
[58] Field of Search ................ 525/80, 83, 79, 84, 525/85, 75

[56] References Cited

U.S. PATENT DOCUMENTS

| 3,644,250 | 2/1972 | Ide et al. | 525/83 |
| 3,652,727 | 3/1972 | Yonezu et al. | 525/80 |
| 3,678,132 | 7/1972 | Isogawa et al. | 525/83 |
| 3,689,598 | 9/1972 | Bierwirth et al. | 525/83 |
| 3,772,409 | 11/1973 | Scarso et al. | 525/80 |
| 3,814,708 | 6/1974 | Nagoshi et al. | 525/83 |
| 3,845,164 | 10/1974 | Goto et al. | 525/83 |
| 4,242,469 | 12/1980 | Schmitt et al. | 525/80 |
| 4,366,281 | 12/1982 | Abe et al. | 525/80 |
| 4,376,843 | 3/1983 | Lindner et al. | 525/83 |

FOREIGN PATENT DOCUMENTS

| 234007 | 5/1961 | Australia | 525/83 |
| 0043512 | 1/1982 | European Pat. Off. | |
| 2317652 | 10/1974 | Fed. Rep. of Germany | 525/80 |
| 2008674 | 1/1970 | France . | |
| 2011501 | 3/1970 | France . | |
| 55-50046 | 4/1980 | Japan | 525/80 |
| 1234135 | 6/1971 | United Kingdom . | |

Primary Examiner—Allan M. Lieberman
Attorney, Agent, or Firm—Connolly and Hutz

[57] ABSTRACT

This invention relates to thermoplastic moulding compositions of vinyl chloride polymers, certain graft polymers, certain resin-like copolymer additives and certain rubber-like copolymers for the production of films having improved resistance to ageing.

2 Claims, No Drawings

MOULDING COMPOSITIONS OF VINYL CHLORIDE POLYMERS, GRAFT POLYMERS AND POLYMERIC PLASTICIZERS HAVING A HIGH RESISTANCE TO AGEING

This invention relates to thermoplastic moulding compositions of vinyl chloride polymers, certain graft polymers, certain resin-like copolymer additives and certain rubber-like copolymers for the production of films having improved resistance to ageing.

Vinyl chloride polymers, particularly polyvinyl chloride (PVC), are widely used starting materials for the production of a variety of plastics articles. It is known that the characteristic property spectrum of vinyl chloride polymers may be varied or modified within wide limits by combination with other substances. Thus, unmodified or only slightly modified PVC moulding compositions (so-called "rigid PVC"), for example, are suitable for the production of mouldings. These moulding compositions show average processing properties, average dimensional stability to heat, moderate toughness and relatively poor flexibility. By combining polyvinyl chloride, for example with so-called plasticisers of low or medium molecular weight, it is possible to produce plastics articles ("flexible PVC") which show high flexibility and elasticity at the use temperatures thereof. The plasticisers used include, for example, phthalates, epoxide compounds, aliphatic diesters, phosphates, polyesters having molecular weights of up to 3000, trimellitates, citrates or certain aliphatic, optionally chlorinated hydrocarbons. These plasticisers are known (see, for example, "Encyclopedia of PVC", Mariel Dekker, Inc. New York, 1976).

In addition, combinations of so-called polymeric plasticisers (polymers of relatively high molecular weight) with vinyl chloride polymers may be used for the production of flexible PVC mouldings having improved mechanical properties, for example improved abrasion resistance, elasticity, solvent reistance and, optionally, better flame resistance. Polymeric plasticisers of the type in question are, for example, partially cross-linked butadiene/acrylonitrile copolymers containing up to 30% by weight of acrylonitrile and having Mooney viscosities (ML 4, 100° C. (DIN 53 523)) of from 60 to 100 (cf., for example, EP 0 005 736), certain polyurethanes (German Patent No. 1,193,241) and certain ethylene/vinyl acetate copolymers soluble in organic solvents (cf., for example, EP 0 005 736).

Plastics blends of high notched impact strength may be obtained by combining vinyl chloride polymers for example, with graft polymers (for example, styrene, α-methyl styrene, acrylonitrile and/or methyl methacrylate grafted onto rubber-like substrates, such as butadiene polymers or acrylate rubbers) or with graft copolymers (vinyl chloride grafted onto certain ethylene/vinyl acetate copolymers containing, for example, 45% by weight of vinyl acetate and 55% by weight of ethylene) or with other polyethylene derivatives.

The rubber components of the graft polymer modifications are preferably of a different character (compared with some of the polymeric plasticisers mentioned above) from the rubbers which may be used as polymeric plasticisers. These differences may be attributable, for example, to chemical composition, to the cross-linking characteristics, to particle morphology and to the grafting characteristic.

In addition, the thermal stability under load of vinyl chloride polymers may be improved by certain modifiers, such as copolymers of styrene, α-methyl styrene, acrylonitrile and methyl methacrylate.

To enable these various polymer combinations to be processed on a commercial scale, the systems have to be effectively stabilised, for example against thermal, photolytic and chemical degradation. Suitable stabilisers and processing aids are, for example, Ba/Cd-, Pb-, Sn-, Zn-stabilisers or organic stabilisers and also phenolic, optionally S- or P-containing oxidation inhibitors, epoxide compounds, waxes, low molecular weight and high molecular weight lubricants. Additives which optimise the processing conditions of the particular system are also necessary.

Such auxiliaries and the processing conditions are described, for example in "Kunststoff Handbuch" Carl Hanser Verlag, Munich (1963).

Specialised applications (for example as laminating films) call for compositions containing vinyl chloride polymers which are capable of meeting specific demands: a combination of toughness, break resistance, flexibility, elasticity (even at relatively low temperatures), thermal stability under load, abrasion resistance, bond strength; an ability to be processed to form sheet-like materials by extrusion, calendering, injection moulding, deep drawing; laminatability with other materials. In addition, the compositions are required to show high resistance to migration, dimensional stability and particular shrinkage properties. They are also required to have an aesthetic surface appearance and to be able to be processed by specialised surface treatment techniques to form articles having a decorative appearance. In addition, materials of the type in question should have a comfortable feel.

This complex set of requirements may be satisfied by subjecting the following composition, for example, to thermoplastic processing in certain quantitative ratios:
  vinyl chloride polymer (for example PVC), low molecular weight plasticiser (for example dioctyl adipate or phthalates), graft polymer (for example ABS-graft polymers), polymeric plasticisers (for example butadiene/acrylonitrile rubbers) and a complex range of stabilisers for the various components and for the mixture as a whole.

Polymer compositions of this type have disadvantages in terms of practical application which limit the scope of application of mouldings produced therefrom (particularly as films). The disadvantages in question are, for example, inadequate resistance to the ageing effects of light, heat, chemicals, other foreign media and also possible chemical interactions between the various components. The resulting ageing is reflected in a loss of mechanical and visual properties (embrittlement, colour deterioration, exudation).

It has now been found that films having improved resistance to ageing may be produced from certain thermoplastic moulding compositions which satisfy the complex set of performance requirements mentioned above.

Accordingly, the present invention relates to thermoplastic moulding compositions containing:
  (A) from 25 to 50 parts, by weight, of a vinyl chloride homo- or co-polymer containing at least 50%, by weight, of vinyl chloride;
  (B) from 25 to 50 parts, by weight, of a mixture of:
    (B) (1): from 20 to 100 parts, by weight, of a graft product obtained by:

(B) (1.1): polymerising a monomer mixture of from 0 to 75 parts, by weight, of (meth) acrylonitrile with from 100 to 25 parts, by weight of styrene and/or p-methyl styrene and/or α-methyl styrene and/or methyl methacrylate, in the presence of:

(B) (1.2): a rubber polymer, the weight ratio of the monomer mixture to the rubber polymer being from 1:10 to 10:1 and the rubber polymer being:

(B) (1.2.1): a copolymer of:
 (a) from 60 to 100 parts, by weight, of an acrylic ester of a $C_1$–$C_{10}$ alcohol;
 (b) from 0 to 40 parts, by weight, of at least one monomer selected from acrylonitrile, methyl methacrylate, vinyl acetate and vinyl ethers; and
 (c) up to 10 parts, by weight, of a cross-linking polyfunctional monomer or polymer;

(B) (1.2.2): an ethylene/propylene terpolymer rubber; and (B) (2): from 0 to 80 parts, by weight, of a copolymer obtained by polymerising from 0 to 75 parts, by weight, of (meth) acrylonitrile and from 100 to 25 parts, by weight, of at least one monomer selected from styrene, α-methyl styrene, p-methyl styrene and methyl methacrylate;

(C) from 0 to 10 parts, by weight, of a resin-like thermoplastic copolymer of a styrene/acrylonitrile or methyl methacrylate/acrylonitrile copolymer which has a Staudinger index $[\eta]$ of $\geq 3$ dl/g, preferably $\geq 4$ dl/g, and of which the $[\eta]$-value is in any case higher than that of the copolymer present in the basic polymer (B);

(D) from 5 to 40 parts, by weight, of a copolymer of:
 (D) (1): an ethylene/vinyl acetate or an ethylene/acrylic ester copolymer containing $\geq 50\%$, by weight, of polar components and having average molecular weights of $\geq 1500$; and/or
 (D) (2): an ethylene/vinyl acetate/carbon monoxide terpolymer containing $\geq 20\%$, by weight, of polar components and having average molecular weights of $\geq 1500$; and/or
 (D) (3): a copolymer of:
 (D) (3.1): from 10 to 99.9 parts, by weight, of an acrylic ester of a $C_1$–$C_{15}$ alcohol;
 (D) (3.2): from 0 to 90 parts, by weight, of at least one polyfunctional monomer containing double bonds in the molecule; and, optionally,
 (D) (3.3): up to 40%, by weight, based on the sum of (D) (1) and (D) (2), of one or more other comonomers, such as acrylonitrile, vinyl acetate and/or methacrylic acid alkyl esters of $C_1$–$C_8$ alcohols having average molecular weights of $\geq 1500$, the copolymer being uncross-linked or partially cross-linked; and (E) from 3 to 30 parts, by weight, of:
 (E) (1): a copolymer produced from:
 (E) (1.1): from 60 to 95 parts, by weight, of a monomer containing two conjugated, olefinic double bonds and/or of an acrylic ester of a $C_1$–$C_6$ alcohol;
 (E) (1.2): from 5 to 40 parts, by weight, of styrene and/or acrylonitrile and/or methacrylic acid methyl ester; optionally
 (E) (1.3): up to 10 parts, by weight, of a cross-linking polyfunctional monomer or polymer containing conjugated double bonds; and
 (E) (1.4): up to 30 parts, by weight, of one or more other comonomers, such as vinyl acetate (meth) acrylic acid or vinyl ethers;

component (E) (1) being different (in at least one parameter) from component (D) (3) and the copolymer (E) (1) having a gel content of $\geq 70\%$; and/or
 (E) (2): an ethylene/propylene terpolymer rubber having a gel content of $\geq 70\%$.

Differentiating parameters for component (E) (1) may include, for example, chemical composition, cross-linking, gel content.

Preferred moulding compositions contain from 25 to 50 parts, by weight, of component (A); from 25 to 50 parts, by weight of component (B); from 1.5 to 3 parts, by weight, of component (C); from 15 to 35 parts, by weight, of component (D); and from 5 to 20 parts, by weight, of component (E).

Vinyl chloride polymers (A) in the context of the present invention are, for example, polyvinyl chloride, copolymers of vinyl chloride with up to 50% by weight, preferably up to 20%, by weight, of one or more copolymerisable compounds, and graft polymers of vinyl chloride on ethylene/vinyl acetate copolymers (for example having vinyl acetate contents of $\leq 50\%$, by weight).

Compounds copolymerisable with vinyl chloride are, for example, vinyl esters of carboxylic acids containing from 1 to 8 carbon atoms in the alkyl moiety, such as vinyl acetate, vinyl propionate, alkyl acrylates, alkyl methacrylates, alkyl vinyl ethers, propylene, maleic acid anhydride, semi- and di-esters of maleic acid with aliphatic alcohols containing from 1 to 8 carbon atoms in the alcohol moiety.

The graft polymer (mixtures) (B) according to the present invention are polymer mixtures of from 20 to 100 parts, by weight, preferably from 50 to 100 parts, by weight, of a graft product and from 0 to 80 parts, by weight, preferably from 0 to 50 parts, by weight, of a copolymer. The graft products are produced by polymerising a monomer mixture of from 0 to 75 parts, by weight, of (meth)acrylonitrile, preferably acrylonitrile, with from 100 to 25 parts, by weight, of styrene, α-methyl styrene and/or methyl methacrylate (preferred monomer mixtures consist of styrene and acrylonitrile, optionally in combination with methyl methacrylate) in the presence of a rubber polymer, the weight ratio of the monomer mixture to the rubber polymer being from 1:10 to 10:1, preferably from 2:8 to 8:2. Rubber polymers are ethylene/propylene terpolymer rubbers, termonomers being understood to be, for example, dienes, such as dicyclopentadiene, hexadiene-(1,4)- or -5-ethylidene-2-norbornene or even tricyclo-pentadiene, heptadiene or octadiene. Such graft polymers are present in the graft products in cross-linked or partially cross-linked form (cf., for example, DE-OS No. 2,539,719).

Other suitable polymers are copolymers of from 60 to 100 parts, by weight, preferably from 80 to 100 parts, by weight, of an acrylic ester of a $C_1$–$C_{10}$ alcohol, preferably an aliphatic $C_1$–$C_8$ alcohol, more particularly butyl acrylate and ethyl hexylacrylate, and from 0 to 40 parts, by weight, preferably from 0 to 20 parts, by weight, of a monomer selected from acrylonitrile, methyl methacrylate, vinyl acetate and vinyl ethers, and up to 10 parts, by weight, of a cross-linking polyfunctional monomer, oligomer of polymer (for example divinyl benzene, alkylene di(meth)acrylates, triallyl (iso)cyanurate, butadiene, polybutadiene, isoprene, allyl methacrylate, allyl vinyl ether, bis-methacrylamides.

The copolymers which may be used for the mixture (B) are obtained by copolymerising from 0 to 75 parts, by weight, of (meth)acrylonitrile with from 100 to 25 parts, by weight, of at least one monomer selected from styrene, α-methyl styrene, p-methyl styrene and methyl methacrylate. Preferred copolymers are copolymers of styrene, α-methyl styrene and acrylonitrile, optionally in combination with methyl methacrylate.

The graft products of mixture (B) preferably contain the rubber in partially cross-linked or highly cross-linked form (having gel contents of the graft product of $\geq 50\%$, more preferably $\geq 70\%$). The rubber is preferably present in the graft product in the form of particles having an average particle diameter of from 0.05 to 5$\mu$.

ABS-polymers containing a cross-linked acrylate or EPDM rubber as the graft base are particularly preferred as component (B). The EPDM rubbers preferably contain from 10 to 90 parts, by weight, of ethylene, from 10 to 90 parts, by weight, of propylene and from 0.1 to 10 parts, by weight, of diene monomer.

Resin-like thermoplastic copolymers (C) in the context of the present invention are styrene/acrylonitrile copolymers or methyl methacrylate/acrylonitrile copolymers which have a Staudinger index $[\eta]$ of $\geq 3$ dl/g, preferably $\geq 4$ dl/g, (as measured in dimethyl formamide (DMF) at 25° C.). However, the Staudinger indices of this thermoplastic component must in any case be higher than the Staudinger indices of the copolymers present in the basic polymer (B) (i.e. the resin components present in the ABS-graft copolymer). Methyl methacrylate/acrylonitrile copolymers containing from 5 to 50%, by weight, of incorporated acrylonitrile are particularly suitable for use as component (C). Particularly preferred polymers (C) consist of from 15 to 40%, by weight, of acrylonitrile and from 85 to 60%, by weight, of methyl methacrylate and have an uncross-linked structure (as reflected in the solubility thereof in suitable organic solvents, such as DMF). These copolymers may optionally contain a relatively low percentage of methacrylic acid esters of $C_2$–$C_8$ alcohols and acrylic acid esters of $C_1$–$C_6$ alcohols incorporated therein.

Component (D) (3) of the compositions according to the present invention consists of copolymers of:

(D) (3.1): from 10 to 99 parts, by weight, preferably from 70 to 99.9 parts, by weight, of at least one acrylic ester of a $C_1$–$C_{15}$ alcohol, preferably an aliphatic alcohol, preferably butyl acrylate, hexyl acrylate, methyl acrylate, ethyl acrylate; butyl acrylate or ethyl hexyl acrylate being particularly preferred;

(D) (3.2): from 0 to 90 parts, by weight, preferably from 0.1 to 30 parts, by weight, of at least one polyfunctional monomer containing double bonds in the molecule, such as divinyl benzene, alkyl (meth)acrylates, triallyl (iso)cyanurate, butadiene, isoprene or allyl (meth) acrylate; and (D) (3.3): up to 40%, by weight, preferably up to 30%, by weight, based on the sum of (D) (1) and (D) (2), of one or more other comonomers, such as acrylonitrile, vinyl acetate and/or methacrylic acid alkyl esters of $C_1$–$C_8$ alcohols, preferably methyl methacrylate. These copolymers may be uncross-linked or partially cross-linked. The soluble parts of of the copolymer should have molecular weights of from 1000 to 2,000,000, preferably $\geq 20,000$; particularly preferred copolymers (D)(3) are copolymers consisting of from 5 to 35 parts, by weight, of acrylonitrile, optionally in admixture with methyl methacrylate and/or vinyl acetate, from 85 to 65 parts, by weight, of butyl acrylate, optionally in admixture with ethylene hexyl acrylate, and from 0 to 10 parts, by weight, of polyfunctional monomers; these products are preferably partially cross-linked and have gel contents of $\geq 30\%$ and swelling indices (as measured in dimethyl formamide) of from 10 to 60, preferably from 15 to 40. Component (D) may also consist of ethylene/vinyl acetate or /acrylate copolymers containing $\geq 50\%$, preferably $\geq 60\%$, of polar components and having average molecular weights of $\geq 1500$, preferably $\geq 10,000$, more preferably $\geq 100,000$. Ethylene/vinyl acetate/carbon monoxide terpolymers containing $\geq 20\%$ of polar components are also suitable.

Component (E) of the compositions according to the present invention is an ethylene/propylene terpolymer rubber with the above-mentioned diene monomers as termonomer, the rubber in question preferably being present in cross-linked form (gel contents of $\geq 70\%$, by weight).

Component (E) (1) of the compositions according to the present invention consists of copolymers of:

(E) (1.1): from 60 to 95 parts, by weight, preferably from 65 to 86 parts, by weight, of a monomer containing conjugated olefinic double bonds (for example butadiene, isoprene or chloroprene) and/or of an acrylic ester of a $C_1$–$C_6$ alcohol (for example ethyl, butyl or hexyl acrylate);

(E) (1.2): from 5 to 40 parts, by weight, preferably from 15 to 35 parts, by weight, of styrene and/or acrylonitrile and/or methacrylic acid methyl ester; optionally (E) (1.3): up to 10 parts, by weight, of a cross-linking polyfunctional monomer or oligomer or polymer containing conjugated double bonds; and (E) (1.4): up to 30 parts, by weight of one or more other comonomers, for example vinyl acetate, (meth)acrylic acid, vinyl ethers or methoxy methacrylamide, preferably vinyl acetate.

Such copolymers should have gel contents of $\geq 70\%$ and should differ from the copolymer (D) (3) in at least one parameter, for example chemical composition, cross-linking, gel content or swelling index.

Preferred copolymers are copolymers of from 20 to 35 parts, by weight, of acrylonitrile and from 80 to 65 parts, by weight, of butadiene (gel contents $\geq 70\%$) or copolymers of from 15 to 35 parts, by weight, of acrylonitrile, from 85 to 65 parts, by weight, of alkyl acrylate and from 0.4 to 10 parts, by weight, of a cross-linking agent (in the form of a polyfunctional vinyl or allyl monomer, for example butadiene, isoprene, diene oligomers, polydienes, $C_2$–$C_{30}$ alkylenes containing terminal polymerisable groups, preferably (meth)acrylic acid esters, polybutadiene nuclei in cross-linked form onto which alkyl acrylate has been grafted in admixture with acrylonitrile). These copolymers may contain incorporated vinyl acetate.

Components (E) (1) should differ from components (D) (3) in at least one parameter. The different effect of components (E) (1) and (D) (3) in the composition according to the present invention may advantageously be obtained by the chemical composition thereof and by the degree of cross-linking (or non-cross-linking), as expressed by the gel content, swelling index and the molecular weight of the soluble part.

Components (D) and (E) of the present moulding compositions may also be used for producing the moulding compositions according to the present invention when they are in the form of certain graft polymers (=graft polymers of the vinylchloride polymers forming component (A) on polymers (D) and (E) as the graft base).

The vinyl chloride polymers suitable for use in accordance with the present invention may be produced by known methods, for example by emulsion, suspension or mass polymerisation.

The graft products suitable for use in accordance with the present invention may be produced by emulsion, suspension, mass, solution and precipitation polymerisation. Particularly suitable processes are emulsion polymerisation, solution polymerisation or combinations of emulsion polymerisation, solution polymerisation or combinations of emulsion or solution and suspension polymerisation.

Particularly preferred graft polymers are obtained by initially subjecting an acrylate (copolymer) rubber to radical polymerisation in aqueous emulsion (in the presence of emulsifiers, radical-formers, regulators) to form an aqueous latex having a latex particle size of from 0.05 to $5\mu$ (optionally in combination with known latex particle agglomeration processes) and radically-polymerising the above-mentioned vinyl monomers (preferably styrene, acrylonitrile and methyl methacrylate) in the presence of this rubber latex in such a way that graft polymers of the vinyl monomers on the rubber latex particles are formed.

One preferred process for producing the graft products based on ethylene/propylene rubber is the known solution or mass polymerisation process with so-called "phase inversion", followed by completion of the graft polymerisation reaction in the melt, in solution or in suspension.

In cases where copolymers (B) (2) are also used for the polymer mixtures according to the present invention, the process by which they are produced has no bearing on the properties of the present moulding compositions, in other words resins obtained by emulsion, suspension, dispersion, mass, precipitation or solution polymerisation may be used as the copolymers (B) (2). After such polymerisation reactions, oxidation inhibitors (for example of the phenol type) may optionally be added. The polymers may be isolated (for example in the form of powders) from graft polymer latices by known methods, for example by coagulation by the addition of electrolytes, acids or solvents, followed by the removal of water from the powders by drying. The thermoplastic additives forming component (C) may be obtained by emulsion or suspension processes in the presence of known surface active substances and initiators, preferably radical-formers. Such polymers may either be isolated from the latex accumulating (for example by spray drying or by coagulation using electrolytes) or alternatively the latices accumulating are mixed and coagulated together with other latices of the composition constituents according to the present invention (for example with the ASA-latex and/or with components (D) and (E) optionally present in latex form.

Such co-coagulation processes give mixtures of components (as constituents of the composition according to the present invention) which are particularly preferred and which lead to moulding compositions having particularly good properties (for example improved processing behaviour of the present compositions).

Component (D) of the compositions according to the present invention may be produced by known radical copolymerisation processes, for example by emulsion, solution, mass or suspension polymerisation and by combinations of emulsion and suspension polymerisation. A combination of aqueous emulsion polymerisation and solution polymerisation is particularly preferred. After the production thereof, the polymers are isolated by known methods, for example by filtration, coagulation and concentration by evaporation, preferably by the coagulation of emulsions.

As with the other components of the moulding compositions according to the present invention, the individual components may be treated and stabilised during or after production using conventional oxidation inhibitors, heat stabilisers or light stabilisers.

Component (E) is preferably produced by methods in which the material may be cross-linked to gel contents of $\geq 70\%$. Accordingly, one preferred process for producing component (E) is emulsion polymerisation (for example in aqueous media). Other suitable production processes are, for example, solution polymerisation (in which a substantially uncross-linked material is formed), followed by the action of cross-linking agents to bring about the necessary cross-linking (for example with or without dispersion of the precondensate obtained by solution polymerisation). Conventional radical-formers and also suitable light sources may be used in these processes.

One particularly suitable process is aqueous emulsion polymerisation, followed by coagulation of the aqueous latices accumulating.

The moulding compositions according to the present invention may be processed by the methods normally used for processing plastics for example injection moulding, extrusion, blow forming, deep drawing and calendering. The moulding compositions are particularly suitable for the production of films.

The intrinsic viscosity values (Staudinger indices) were determined in the particular solvent indicated. For definitions of the Staudinger index, swelling index and gel content, see M. Hoffmann, H. Kromer, R. Kuhn in "Polymeranalytik I und II", Georg-Thieme Verlag (Stuttgart 1977).

The graft rubber particle sizes are $d_{50}$ (diameter)values, as determined by ultracentrifuge measurements (cf. W. Scholtan, H. Lange, Kolloidz. und Z. polymere 250 (1972) 738–796)

For producing the moulding compositions described in Table 2, X parts, by weight, of polyvinyl chloride (K-value 70) are combined with different quantities of various products (Table 1). In each case, 2%, by weight, of Ba/Cd-laurate (solid), 0.3%, by weight, of sterically hindered, phenolic oxidation inhibitor (solid) and 0.2%, by weight, of ester wax are added for stabilisation and lubrication. The moulding compositions are homogenised on mixing rolls for 10 minutes at 180° C. and moulded at 190° C. to form test specimens.

Table 1

Polymers used

Product 1.1: A mixture of 94 parts, by weight, of an ABS-polymer and 6 parts, by weight, of a methyl methacrylate/acrylonitrile copolymer containing 32%, by weight, of acrylonitrile and having a Staudinger index of 5 dl/g (in DMF at 25° C.); the ABS polymer produced by emulsion polymerisation contains 30%, by weight, of polybutadiene having a gel content of 70% and a particle size of $0.4\mu$.

Product 1.2: A mixture of 94 parts, by weight, of an ASA-polymer and 6 parts, by weight, of a methyl methacrylate/acrylonitrile copolymer containing 32%, by weight, of acrylonitrile and having a Staudinger index of 5 dl/g; the ASA polymer produced by emulsion polymerisation contains 30%, by weight, of acrylate rubber having a gel content of ≧70% and a rubber particle size of approximately 0.5μ.

Product 1.3: A mixture of 94 parts, by weight, of an AES-polymer and 6 parts, by weight, of a styrene/acrylonitrile copolymer having a Staudinger index of 10 dl/g (in DMF at 25° C.); the AES-polymer produced by mass/suspension polymerisation contains approximately 28%, by weight, of partially cross-linked EPDM-rubber having a gel content of 70% and a particle size of from 0.4 to 5μ and 72%, by weight, of SAN which polymerises in the presence of the EPDM-rubber.

Product 1.4: Emulsion polymerisation at 65° C. in accordance with the following general formulation gives a latex from which a rubber-like polymer is obtained by coagulation with MgSO₄:
2590 parts, by weight, of water
25 parts, by weight, of Na-$C_{14}$-$C_{16}$ alkylsulphonate
2 parts, by weight, of potassium peroxydisulphate
1181 parts, by weight, of butyl acrylate
300 parts, by weight, of vinyl acetate
94 parts, by weight, of acrylonitrile
7 parts, by weight, of NaHCO₃

The polymer is soluble in organic solvents and has a Staudinger index of 1.2 dl/g in dimethyl formamide (DMF).

Product 1.5: Emulsion polymerisation at 65° C. in accordance with the following formulation gives a latex from which a rubber-like polymer is obtained by coagulation with MgSO₄:
2590 parts, by weight, of water
27 parts, by weight, of Na-$C_{14}$-$C_{16}$ alkylsulphonate
2 parts, by weight, of potassium peroxydisulphate
1182 parts, by weight, of butyl acrylate
393 parts, by weight, of acrylonitrile
4 parts, by weight, of triallyl cyanurate The polymer has a gel content of 92% (in DMF) and a swelling index of 19.8.

Product 1.6: The polymer consists of 70%, by weight, of vinyl acetate and 30%, by weight, of ethylene and has an average molecular weight of 200,000.

Product 1.7: The polymer consists of 6%, by weight, of carbon monoxide, 24%, by weight, of vinyl acetate and 70%, by weight, of ethylene and has a molecular weight of approximately 150,000.

Product 1.8 The polymer consists of 29%, by weight, of acrylonitrile and 71%, by weight, of butadiene, is an emulsion polymer and has a gel content of 60%.

TABLE 2

| | Example 1 | | Example 2 | | Example 3 | | Example 4 | | Example 5 | | Example 6 | |
|---|---|---|---|---|---|---|---|---|---|---|---|---|
| Prod. | PBW* | Prod. | PBW | Prod | PBW | Prod. | PBW | Prod. | PBW | Prod. | PBW | |
| PVC | 36 | PVC | 30 | PVC | 30 | PVC | 30 | PVC | 30 | PVC | 36 | |
| 1.1 | 36 | 1.2 | 45 | 1.2 | 45 | 1.3 | 45 | 1.2 | 45 | 1.2 | 36 | |
| DIDP** | 18 | 1.6 | 30 | 1.4 | 35 | 1.4 | 35 | 1.7 | 28 | DIDP | 18 | |
| 1.8 | 10 | 1.5 | 10 | 1.5 | 10 | 1.8 | 5 | 1.5 | 10 | 1.5 | 10 | |
| | | | | | | 1.5 | 5 | | | | | |
| Tensile strength MPa DIN 53 455 | 22.3 | | 23.5 | | 22.7 | | 20.9 | | 21.8 | | 20.2 | |
| Elongation % DIN 53 455 | 230 | | 285 | | 270 | | 265 | | 238 | | 220 | |
| Vicat value °C. DIN 53 460 Method A | 80 | | 75 | | 80 | | 78 | | 76 | | 79 | |
| Shore hardness D DIN 54 505 | 51 | | 53 | | 56 | | 57 | | 51 | | 50 | |
| Tear propagation resistance N/mm DIN 53 515 | 83 | | 74 | | 60 | | 64 | | 70 | | 78 | |
| Elongation % after ageing (120° C., 21d) DIN 53 455 | 4 | | 219 | | 214 | | 106 | | 171 | | 65 | |

*PBW = parts, by weight
**DIDP = Diisodecyl phthalate

As may be seen from the Table, moulding compositions formulated in accordance with the present invention show a considerably improved level of mechanical properties after ageing than the known moulding compositions of Example 1. Moulding compositions characterised by particularly favourable resistance to ageing are obtained in particular by combining ASA- or AES-polymers with rubber-like ethylene copolymers or acrylate copolymers.

We claim:

1. A thermoplastic molding composition comprising from 25 to 50 parts (A), from 25 to 50 parts (B), from 0 to 10 parts (C), from 5 to 40 parts (D) and from 3 to 30 parts (E), where all parts are by weight of the molding composition, and where:
   (A) is a polymer containing at least 50%, based on the weight of (A), of vinyl chloride;
   (B) is a mixture comprising 20% to 100%, based on the weight of (B), of (B) (1) and from 0% to 80%, based on the weight of (B), of (B) (2); wherein (B) (1) is a graft product comprising a monomer grafted onto a substrate in a ratio of monomer to substrate of from 1:10 to 10:1, and where the monomer is from 0% to 75%, based on the weight of the monomer, of (meth) acrylonitrile and from 100% to 25%, based on the weight of the monomer, of styrene, p-methyl styrene, alpha-methyl styrene, methyl methacrylate or combinations thereof; and the substrate is selected from a first rubber polymer comprising from 60% to 100%, based on the weight of the first rubber polymer, of a first acrylic ester where said first acrylic ester is an acrylic ester of an alcohol having from one to ten carbon atoms; from 0% to 40%, based on the weight of the first rubber polymer, of acrylonitrile, methyl methacrylate, vinyl acetate, vinyl ether or combinations thereof; and from 0% to 10%, based on the weight of the first rubber polymer, of a cross-linking bifunctonal or polyfunctional monomer or polymer; and a second rubber polymer comprising an ethylene/propylene terpolymer rubber; and wherein (B) (2) is a copolymer consisting of from 0% to 75%, based on the weight of (B) (2), of (meth) acrylonitrile and from 100% to 25%, based on the weight of (B) (2), of styrene, alphamethyl styrene, p-methyl styrene, methyl methacrylate or combinations thereof;

(C) is a resin-like, thermoplastic copolymer of styrene and acrylonitrile or methyl methacrylate and acrylonitrile where component (C) has a Staudinger index value which is greater than or equal to 3 dl/g and which is higher than the Staudinger index value of component (B);

(D) is a copolymer selected from the group consisting of (D) (1), (D) (2), (D) (3) and any combination thereof where (D) (1) is selected from the group consisting of ethylene/vinyl acetate copolymers containing greater than or equal to 50%, based on the weight of the ethylene/vinyl acetate copolymer, of polar components and having an average molecular weight of greater than or equal to 1500; and ethylene/acrylic ester copolymers containing greater than or equal to 50%, based on the weight of the ethylene/acrylic ester copolymer, of polar components and having an average molecular weight of greater than or equal to 1500; and (D) (2) is an ethylene/vinyl acetate/carbon monoxide terpolymer containing greater than or equal to 20%, based on the weight of (D) (2), of polar components and having an average molecular weight of greater than or equal to 1500; and (D) (3) is a copolymer comprising: from 10% to 99%, based on the weight of (D) (3), of an acrylic ester of an alcohol containing one to fifteen carbon atoms; from 0% to 90%, based on the weight of (D) (3), of at least one bifunctional or polyfunctional monomer containing conjugated or unconjugated double bonds; and from 0% to 40%, based on the weight of the sum of (D) (1) and (D) (2), of acrylonitrile, vinyl acetate, methacrylic acid alkyl esters of alcohols having from one to eight carbon atoms or combinations thereof, average molecular weight of greater than or equal to 1500; and (E) is a copolymer comprising (E) (1), (E), (2) or combinations thereof where (E) (1) is a copolymer comprising from 60 to 95%, based on the weight of (E) (1), of a monomer containing 2 conjugated olefinic double bonds or a second acrylic ester where said second acrylic ester is an acrylic ester of an alcohol containing one to six carbon atoms or mixtures thereof; from 5 to 40%, based on the weight of (E) (1), of styrene, acrylonitrile, methacrylic acid methyl ester or combinations thereof; and from 0 to 10%, based on the weight of (E) (1), of a cross-linked bifunctional or polyfunctional monomer or polymer containing conjugated double bonds; from 0% to 30%, based on the weight of (E) (1) of vinyl acetate, acrylic acid, methacrylic acid, vinyl ethers or combinations thereof;

where (E) (1) has a gel content of greater than or equal to 70% and where (E) (1) is different from (D) (3) in at least one parameter; and (E) (2) is an ethylene/propylene terpolymer rubber having a gel content of greater than or equal to 70%.

2. A film comprising the thermoplastic molding composition of claim 1.

* * * * *